United States Patent
Pulliam

(10) Patent No.: US 7,992,501 B2
(45) Date of Patent: Aug. 9, 2011

(54) TRANSPORTATION SYSTEM

(75) Inventor: Robert C. Pulliam, Houston, TX (US)

(73) Assignee: Tubular Rail, Inc., Houston, TX (US)

( * ) Notice: Subject to any disclaimer, the term of this patent is extended or adjusted under 35 U.S.C. 154(b) by 0 days.

(21) Appl. No.: 12/371,986

(22) Filed: Feb. 17, 2009

(65) Prior Publication Data

US 2009/0158955 A1  Jun. 25, 2009

Related U.S. Application Data

(60) Division of application No. 11/460,088, filed on Jul. 26, 2006, now Pat. No. 7,490,557, which is a continuation of application No. 10/950,949, filed on Sep. 27, 2004, now Pat. No. 7,137,343.

(60) Provisional application No. 60/506,896, filed on Sep. 29, 2003.

(51) Int. Cl.
*B61B 5/00* (2006.01)

(52) U.S. Cl. .............................. 104/168; 104/124

(58) Field of Classification Search .............. 105/1.1, 105/1.2, 1.3; 104/168, 138.1, 124, 125, 35, 104/163, 23.1, 23.2
See application file for complete search history.

(56) References Cited

U.S. PATENT DOCUMENTS

| | | | | |
|---|---|---|---|---|
| 3,006,288 A * | 10/1961 | Brown | ................... | 104/138.1 |
| 3,848,535 A * | 11/1974 | Mitchell | ................... | 104/124 |
| 3,919,947 A * | 11/1975 | Simon et al. | ................... | 104/124 |
| RE29,438 E * | 10/1977 | MacCracken et al. | ......... | 165/46 |
| 7,490,557 B2 * | 2/2009 | Pulliam | ................... | 104/125 |

* cited by examiner

*Primary Examiner* — Mark T Le
(74) *Attorney, Agent, or Firm* — Conley Rose, P.C.

(57) ABSTRACT

A mass transit system includes a plurality of pedestal-mounted rings which provide a support through which a vehicle travels. The pedestals are spaced apart on the ground, but no rail or connecting structure on or above ground is required. An underground conduit carries electrical and communications cable that connects the pedestals together. The rings include a plurality of rollers to drive, guide and stabilize the vehicle at lower speeds. For higher speeds flywheels are mounted on the pedestals. The flywheels are preferably driven by an electrical motor, which engages a friction or clutch plate on the vehicle separate from the rings. The friction plate or linear clutch is mounted separate from the rings on the vehicle and is lowered to engage and disengage the flywheel. The flywheel is also mounted on a shock absorber to smooth the travel of the vehicle.

17 Claims, 10 Drawing Sheets

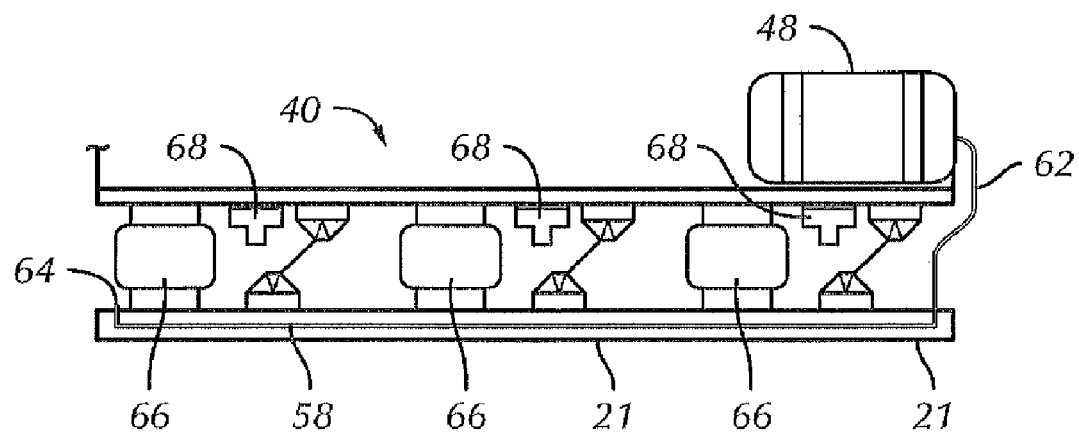
FIG. 7
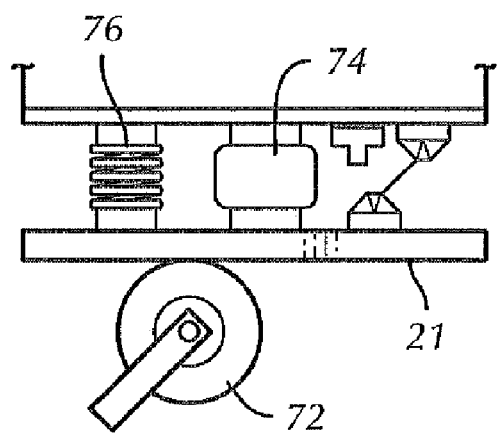 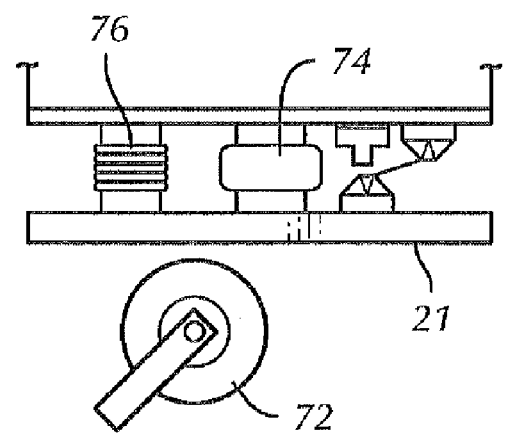
FIG. 8a          FIG. 8b

TRANSPORTATION SYSTEM

CROSS-REFERENCE TO RELATED APPLICATIONS

The present application is a divisional of U.S. patent application Ser. No. 11/460,088, filed Jul. 26, 2006, now U.S. Pat. No. 7,490,557, which is a continuing application of U.S. patent application Ser. No. 10/950,949, filed Sep. 27, 2004, now U.S. Pat. No. 7,137,343, and further claims the benefit of 35 U.S.C.(b) U.S. Provisional Application Ser. No. 60/506,896, filed Sep. 29, 2003, all hereby incorporated herein by reference.

BACKGROUND OF THE INVENTION

1. Field of the Invention

The present invention relates generally to the field of transportation systems and, more particularly, to a mass-transit system including a plurality of pedestal mounted rings to guide and propel an elongated vehicle carrying passengers, cargo, and the like.

2. Background of the Invention

Transportation of people and cargo has become increasingly important in our modern lives. In the United States, modes of travel between cities offer few options, typically by air, bus, personal automobile, and to a limited extent by conventional rail. Other countries in the world, most notably Japan and France, have developed high speed rail systems between major destinations, but these systems rely for the most part on conventional rail infrastructure with some technological improvements in the rails and the locomotives.

A major drawback in such conventional rail systems lies in the exorbitant costs of building, maintaining, and operating such systems. The initial cost of building a high-speed, conventional rail system can run into literally billions of U.S. dollars, depending on the size of the rail system, the geographical obstacles that have to be overcome, and many other factors. In fact, there is a real need for mass transit between cities, where the initial cost is the overriding barrier to the installation of such a system.

Another drawback to conventional rail systems is the problem of the environmental impact of such systems. Typically, rail systems include a right of way which must be cleared and on which the rails and various support systems are installed. Also, the locomotives are most often diesel powered, which contributes to air born pollution. For electric systems, the amount of electrical power that is consumed must be provided by power generation systems, which throughout the world are principally hydrocarbon fueled, again contributing to the pollution loading of the world's environment. The environmental impact of such systems also includes the man-made barriers of the rails and the right of ways.

Another important innovation in recent times was the magnetic levitation (MagLev) system. While such systems have improved the speed of travel, such systems also rely on continuous rail, whether on the ground or suspended in the air.

Thus, there remains a need for a transportation system for which rails are not required. Such a system should be relatively inexpensive to build and operate, and should not create the man-made barriers so common in conventional rail systems. The present invention is directed to such a system.

SUMMARY OF THE INVENTION

The present invention solves these and other needs in the art by providing a plurality of pedestal mounted rings through which a vehicle travels. The pedestals are spaced apart on the ground, but no rail or connecting structure on or above ground is required. Power is made available from a source which may be an underground conduit carrying electrical and communications cable that connects the pedestals together.

The rings include a plurality of rollers to guide and stabilize the vehicle. The rollers in the rings engage the rails and also provide motive force to move the vehicle at lower speed levels. The rollers are driven by electrical motors for lower speed transportation systems. Also, mounted on each pedestal is a flywheel, preferably driven by an electrical motor, which engages a friction plate on the vehicle. The friction plate or linear clutch is lowered to engage and disengage the flywheel on the pedestal. The flywheel is also mounted on a shock absorber to smooth the travel of the vehicle.

For lower speed transportation systems, the friction plate serves as a friction clutch and is used for vehicle braking purposes. For higher speed transportation systems, the flywheel transfers motive force to the friction plate to propel the vehicle through the supports of the system, while the action of the rollers and rails is used primarily for steering or guidance purposes.

The rings are large enough to enclose the diameter of the vehicle, about 20 feet in diameter in the preferred embodiment. The pedestal is preferably about 16 feet high, or more, to provide adequate clearance for any automobile or other wheeled vehicle traveling on a roadway underneath the line of travel of the vehicle of the present invention. The pedestal is mounted to a robust base structure, which may extend, for example, 30 feet below the surface of the ground, in order to provide sufficient margin for the strength of the support system.

The present invention also includes an energy saving feature which provides support rails along the vehicle to engage the rollers on the rings. The vehicle rails are preferably hollow rectangular conduits which carry liquid nitrogen or other suitably cold fluids. The nitrogen is carried on board the vehicle and vented or circulated to the vehicle rails. The nitrogen rapidly cools the rails, and thereby creates an ice layer on the rails by condensing atmospheric moisture on the rail. The ice layer substantially reduces the drag that the vehicle experiences as it travels by limiting the ability of the rail and rollers to bond together.

These and other objects and advantages of the present invention will be apparent to those skilled in the art from a review of the following detailed description along with the accompanying drawing figures.

BRIEF DESCRIPTION OF THE DRAWINGS

FIG. 7 is a side detail view illustrating certain features of a vehicle of this invention.

FIGS. 8a and 8b are side elevation views of the vehicle illustrating clutch engagement and disengagement of the flywheel, in accordance with this invention.

DETAILED DESCRIPTION OF THE PREFERRED EMBODIMENTS

Figure 1:
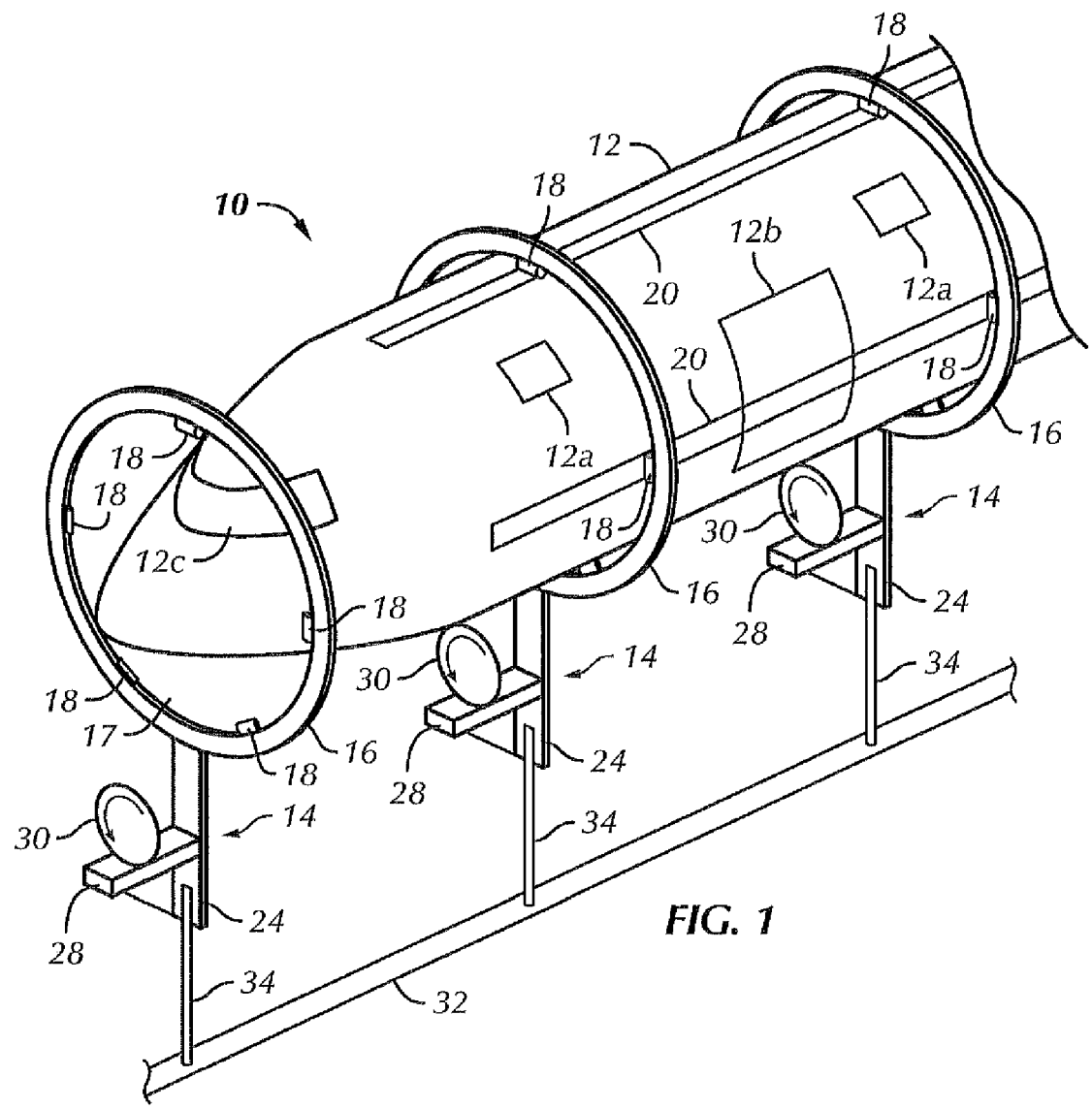
FIG. 1 is an overall perspective view of the transportation system of this invention.

FIG. 1 depicts an overall schematic of a transportation system 10 constructed in accordance with this invention. The system 10 comprises an elongated car or vehicle 12 and a plurality of supports 14. The car or vehicle 12 may have suitable number of appropriately located windows 12a and doors 12b, and a cockpit 12c for an operator. If the vehicle is to be fully automated, the cockpit 12c may serve as an observation area for safety or emergency control purposes. The vehicle body 12 is presently contemplated to be a unitary structure or it may be an articulated body, if desired.

The supports 14 are arranged to define a route of travel along a desired course at an elevated height for transport of passengers and cargo. In a contemplated embodiment, the vehicle 12 is about 500 feet long, and the supports are about 200 feet apart, so that there are typically at least two, and optionally three or mores supports 14 in contact with a vehicle 12 at any time. The spacing of the supports 14 and the length of the vehicle 12 are interrelated and may be adjusted based on travel speed, load capacity and other requirements. To the extent that support of the moving vehicle is to be increased, the spacing between the supports 14 can be adjusted so that the vehicle 12 is supported at all times by at least three sets of supports 14 and intermittently by four or more supports 14. It is presently contemplated that the spacing of supports 14 should not exceed fifty percent of the length of the vehicle 12, and in practice it may be less.

The support 14 includes a ring 16, preferably formed of a hard and strong metal, such as steel. The supports 14 are not shown in certain figures in the drawings so that other structures such as rings 16 may be more clearly seem As contemplated by the present invention, the term ring is intended to encompass a variety of shapes in vertical cross-section in addition to those of generally circular or elliptical shape. A ring according to the present invention is a support body mounted at an elevated or overhead position with one or more portals or passages through which the body 40 of the vehicle 12 passes. The vehicle 12, as will be set forth below, receives motive force from structure in the rings 16 as it passes through the series of rings 16.

Figure 4:
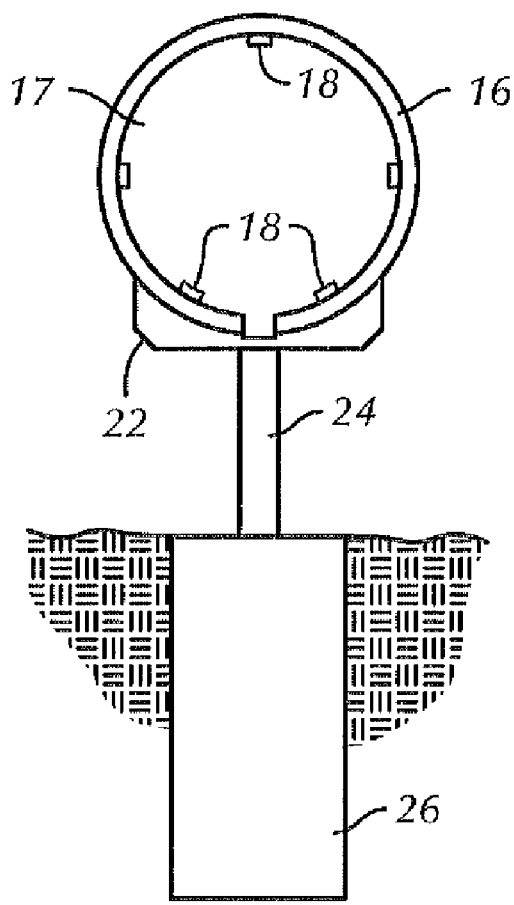
FIG. 4 and 4a are front elevation views of a ring of this invention, including pedestal base, and vehicle guide rollers.

The ring 16 has one or more portals or passages 17 formed in it. The portals or passages 17 may be circular (FIGS. 4 and 4a), elliptical, generally rectangular (FIG. 4B) or other shape in vertical cross section. In some instances, the rings 16 need not include top portions, but may be generally U-shaped with a bottom portion and upwardly extending arms and rollers 18 to retain, power and guide the vehicle 12. The arms could be either vertically oriented or inwardly or outwardly inclined. The shape of the portals 17 is established in conformity to the general outer shape of the body 40 of the vehicle 12 used in the system 10. As will be set forth, the rings 16 may have portals 17 in horizontal tandems (FIG. 4c) for parallel, same direction travel of vehicle 12 during peak travel time, or two-way travel along the route of travel during routine travel times, or for storage of vehicles 12 (FIG. 11) when not in use. Further, the rings 16 can be arranged in vertical multiples (FIG. 10) for parallel, same direction travel, two-way travel or for storage of vehicles 12 when not in use.

The vehicles 12 may be of different shapes based on travel speed, load requirements, the course of travel and other factors, with the form of the rings 16 and portals 17 conforming to the shape and function of the vehicle 12. In urban applications, double or parallel travel (FIG. 4c) in congested areas is likely, therefore the vehicle 12 is narrower in width than a high-speed intercity version. The narrower body version allows the vehicle 12 to negotiate a smaller radius curve than would a high-speed version having a greater width. For urban and other high traffic volume applications, the rings 16 may be double portals 17, or more, and the shape of the portals 17 altered to a more rectangular shape due to lower speed and higher passenger or cargo capacity. A plurality or rollers 18 are mounted on the inside surface of the ring 16 in the portals 17. The rollers 18 serve to support and guide tie vehicle 12 through the ring 16. For vehicles 12 traveling at lower travel speeds, at least some of the rollers 18 are driven by motors to move the vehicle 12 along its travel path through the rings 16. If desire, all of the rollers 18 may be motor driven for this purpose. Mounted on the vehicle 12 at suitable points about its periphery to engage the rollers 18 are a like number of rails 20.

The rails 20 which are in contact with rollers 18 and driven by a suitable power source thus receive motive force to move the vehicle 12 at lower ranges of speed through the transportation system 10. The rails 20 may be longitudinally continuous along the body of the vehicle 12, or they may be either articulated or provided in segments, if desired.

Mounted at one or more positions about the periphery of the vehicle 12 and separate from the weight-carrying rails 20 are one or more longitudinally extending motive force transfer plates 21. The plates 21 serve as part of a friction clutch or linear clutch. At lease one such plate 21 is provided, although it should be understood that there may be two or more such motive force transfer plates on the vehicle 12 based on load and travel speed requirements, if desired.

The friction clutch or clutches 21 may be longitudinally continuous or segmented along the length of the vehicle 12. The rollers 18 and the rails 20 are shown in greater detail in FIGS. 5a, 5b, 6a, and 6b. The rails 20 and rollers 18 not driven by motors are passive elements, producing no motive force to move the vehicle 12. Rather, as noted, for lower speed operation one or more of the rails 20 receive motive force from drive mechanisms or motors for some or all of the rollers 18 mounted with the support 14.

Thus, the present invention permits the shape of the vehicle 12 to be of a design to accommodate a variety of capacity ranges and travel routes. Much like railroads, overhead systems according to the present invention may have areas of single (FIGS. 4, 4a and 4b), double (FIG. 4c) and even triple (FIG. 11) travel paths. The main function of the rings 16 is to act as a support structure for the rollers 18. The rollers 18 are designed to match with the alignment of the rails 20 on the car 12. Again, as noted the final shape of the rings 16 is a function of the shape of the car 12.

A secondary function of the rings 16 is a safety feature. Since each ring 16 completely encircles the body 40 of the car 12 along a circumferential portion of its length, the car 12 is guided to move through the series of rings 16 in its direction of travel. Unlike railroads where possible disastrous consequences may occur if there is a derailment, the tubular overhead guide design of the present invention means that in the unlikely event of a roller failure, the clutch plates 21 and rails 20 on the car 12 then come in contact with the reinforced body of the rings 16 and the car 12 would then slide to a stop. The fact that the rings 16 enclose the car 12 in a 360° manner while the car 12 is supported by at least three rings 16 means that the car 12 may proceed to the next ring along the travel path under its own momentum in the event of power loss or roller failure. Another benefit of the circumferentially enclosing ring 16 as opposed to an open top is that this enclosing structure provides greater structural strength to the ring 16.

Figure 4A:
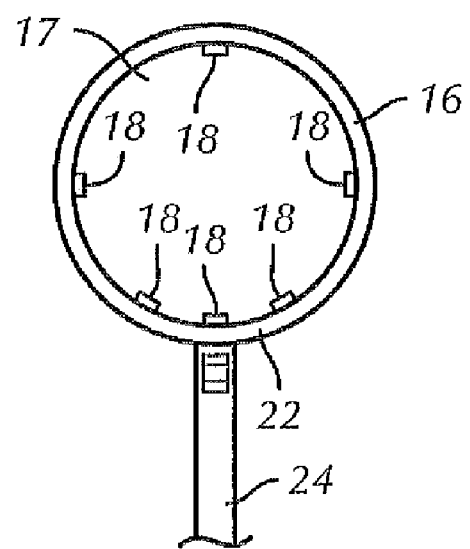
Figure 4B:
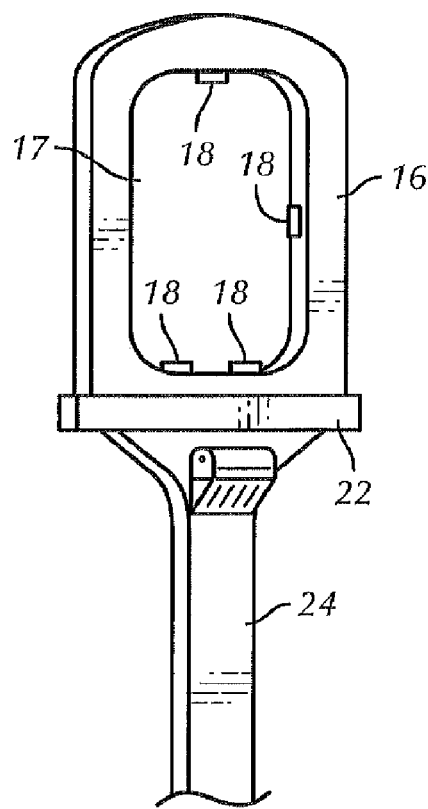
FIGS. 4b and 4c are isometric views of other alternate rings according to the present invention.
Figure 4C:
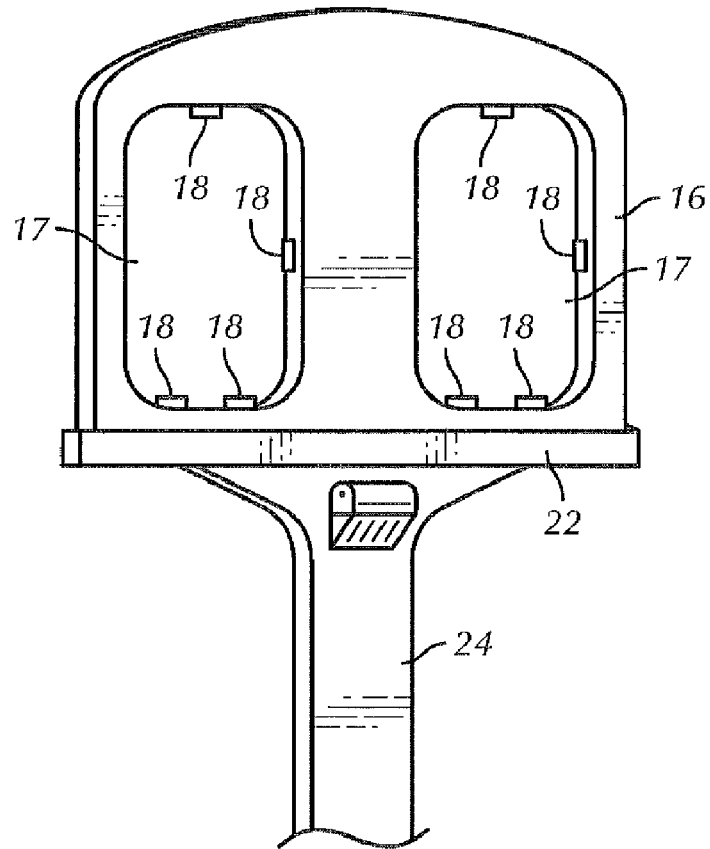

Turning to FIG. 4a, an example ring 16 and related components are illustrated. Mounted on the inside of the ring 16 are the rollers 18, with at least one roller 18 mounted on the top and at least one roller 18 mounted on each side. There are preferably two such rollers 18 on the bottom, to provide greater vertical support of the vehicle 12 and to provide greater lateral stability. The number of rollers 18 provided in the ring 16 below the vehicle 12 may be increased, if desired, for load and weight distribution purposes.

The ring 16 is mounted in a support member 22, which may preferably be reinforced concrete. The support member 22 may of course be made of steel or of other suitable structural material if desired. The support member 22 is mounted on top of a pedestal 24, which may for example be about sixteen feet high, three feet wide, and tree feet thick. The pedestal 24 may be of concrete, steel or other suitable structural materials. Those of skill in the art will recognize that the height of the pedestal may vary with the topography of the land over which the system 10 is installed in order to make the travel path of the vehicle 12 substantially level, so that movement of the car 12 is as even and smooth as possible. The pedestal 24 is mounted to and formed contiguously with a base 26, which preferably extends about thirty feet into the ground, and is ten feet wide, and three feet thick. The base 26 as shown is intended as illustrative only, and will vary depending on the subterranean structure of the subsoil, climate and weather factors and other such considerations.

Unlike traditional railways that carry their power generating capacity with them in the form of a locomotive (the French TGV system having about 12,000 hp) that generates power and transmits it to stationary rails, the present invention has a power source (motors) on the rings 16 that impart motive force to the moving vehicle 12.

An advantage of this is that power demand for moving the vehicle 12 is matched to localized need. In other words additional power is supplied for rings located in areas along the route of travel where acceleration of the vehicle 12 is required and less power is provided where the need is for power in maintaining momentum of the vehicle 12.

Direct drive of the moving vehicle 12 is, as noted, furnished by stationary electric motors for the rollers 18 at lower speeds such as in urban areas. This allows systems to have increased size of motors and a greater number of motors for areas of acceleration or hill climbing. Further, with the present invention, once design speed has been achieved for a given section of route by the vehicle 12, as the vehicle 12 enters the next ring 16 along the route of travel it encounters the rollers 18 of that next ring 16 at a time when those rollers have been brought up to a speed by their drive motors slightly higher than the design speed of the vehicle 12 for that section of the route. The motors are preset as to speed and timing and the vehicle operator serves mainly in a safety capacity role. If in low speed urban systems where frequent stops and starts can be expected, it will be possible in some cases to slightly elevate the line of travel going into and out of the stations. This serves two purposes. The first is to aid in acceleration as the vehicle 12 leaves a station, i.e., it begins to move from a ring 16 at a slightly elevated position. The second is to assist at the next station in braking as the vehicle 12 approaches a station or stop to a slightly elevated ring 16, i.e., the vehicle 12 is essentially climbing and thus decelerating as it comes to a stop at that station. This technique captures the kinetic energy of the vehicle 12 and stores it in the vehicle 12 as potential energy and its use may be made available as needed on a case-by-case basis.

The present invention also allows the rollers 18 to transfer the kinetic energy of the moving vehicle 12 as it is entering a station back into the system in the braking mode. The kinetic energy may be converted to another form as it is received then used to drive the motors and regenerate power and feed it back to move the vehicle as it departs. This is an optional feature which may or may not be used, based on cost effectiveness conservations. It is also contemplated that power sources such as linear induction motors can also be used to drive the vehicle 12 and provide braking, if desired.

For provision of power for higher speed systems, usually above 55 mph, other sources are presently contemplated to provide motive forces to the vehicle 12. Returning now to FIG. 1, the pedestals 24 as spaced apart along the path of travel of the vehicle 12. On each pedestal 24 is mounted a support platform 28, each of which retains a flywheel assembly 30, shown and described below with regard to FIGS. 9a and 9b.

The flywheel assemblies are used to provide motive power to the vehicle 12, preferably for higher speeds. Each flywheel assembly 30 includes a flywheel 72 (FIGS. 9a and 9b), driven by an electric motor 80, which is supplied with electrical power from an electrical power supply bus 32, (FIG. 1) typically under ground. A conductor 34 taps off the bus 32 to provide power to the motor 80. The bus 32 includes redundant power mains, and is supplied from redundant sources for safety and reliability purposes. Thus, in operation, the vehicle 12 is driven by a minimum of two and preferably at least three flywheels 72 as the vehicle 12 moves along its path of travel through a succession of supports 14 and rings 16 in the system 10.

Figure 3:
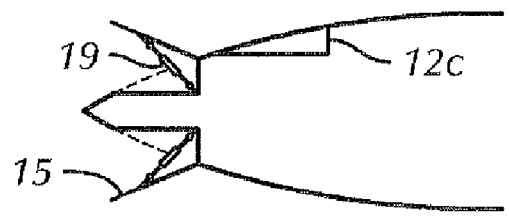
FIG. 3 is a side elevation view of one end of a vehicle, illustrating an air resistance braking system which assists in stopping a vehicle.

On the bottom of the vehicle 12 are one or more transfer plates or linear friction clutch plates 21, shown and described below with regard to FIGS. 8a and 8b. As the vehicle 12 moves along at higher speeds, the flywheel 72 frictionally engages the linear clutch plate 21, moving the vehicle in the direction of movement of the flywheel 72. The linear clutch plate 21 forms with the flywheel 72 a linear friction clutch which can be used for a number of purposes according to the present invention. The clutch plate 21 and flywheel 72 may be used to provide momentum to move the vehicle 12 through the system 10 with the flywheel 72 rotating in a direction corresponding to desired movement of the vehicle 12. The direction of rotation of the flywheel 72 may be reverse and through contact with the plate 21 provide braking to the vehicle 12. The plates 21 may also be located at positions corresponding to rest or support pads on the structure of rings 16 for braking purposes or to support the vehicle 12 at a stationary or storage position. The vehicle 12 is bi-directional in its movement, governed by the direction of rotation of the flywheel 72. There are no active drive components on the vehicle 12; its direction of travel is governed on these external components. To assist in slowing the vehicle, a cowling 15 actuated by air cylinders 19 is provided, as shown in FIG. 3.

Figure 9A:
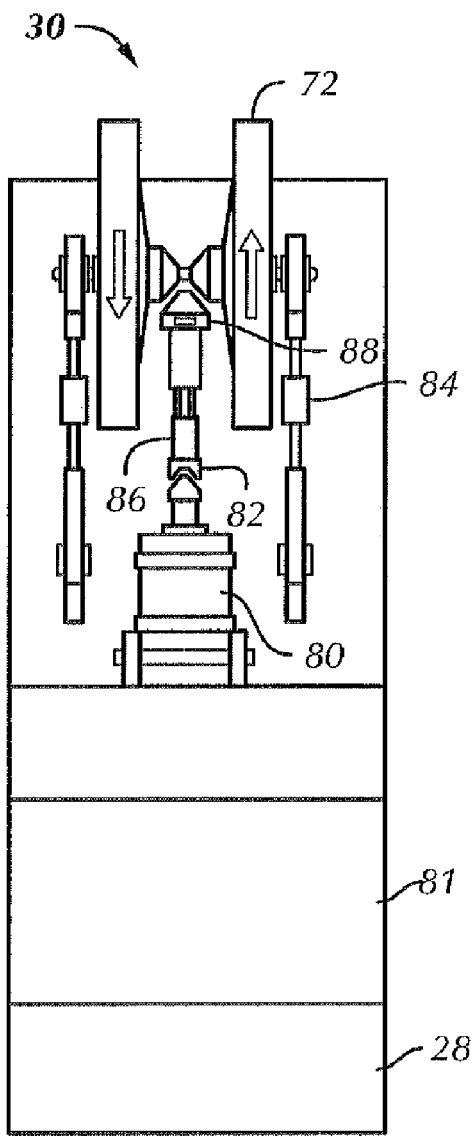
FIGS. 9a and 9b are front and side view of a flywheel assembly of this invention.
Figure 9B:
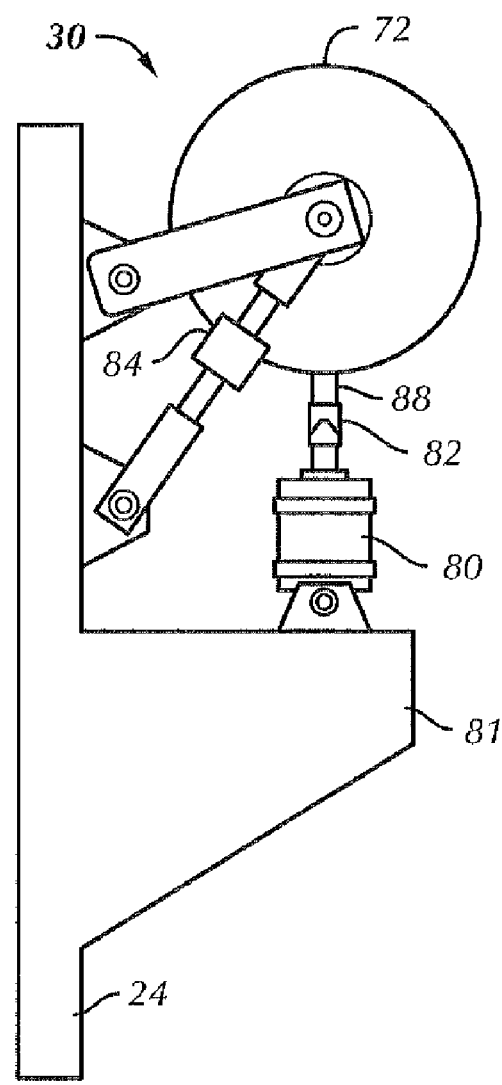

The friction clutch plate or plates 21 are typically located beneath the body 40 of the vehicle 12 for higher speed operations. If desired, the clutch plates 21 may be located on the sides or top of the vehicle 12 to be engaged by correspondingly positioned flywheels 72. If the flywheel assembly 30, as shown in FIG. 9a and 9b, has a set of oppositely driven flywheels 72, two clutch plates 21 of like construction to that shown in FIG. 7 are mounted with the vehicle 12 at locations corresponding to the place and spacing of the flywheels 72. The clutch plate or plates 21 provide friction engagement with the flywheel 72 of the flywheel assembly 30. To engage the flywheel 72 with the clutch plate 21, an air bag or other suitable reciprocating movement mechanism 74 is inflated, forcing the clutch plate 21 downward until it contacts the flywheel 72. A spring 76 or other energy and impact absorbing mechanism is provided to reduce possible shock transmitted from the flywheel assembly 30 to the vehicle 12. The clutch plate 21 may also be used at appropriately low speeds of the vehicle 12 as motion retarder and as a form of emergency brake by being brought into contact with oppositely rotating flywheels 72 or the rails 20.

Further details of the flywheel assembly 30 are shown in FIGS. 9a and 9b. The flywheel 72 is driven by the electric motor 80 through a shaft 86. The electric motor 80 is driven by power through a suitable connection to the conductor 34 (FIG. 1). The electric motor 80 is mounted at a suitable position such as a platform 81 mounted with the pedestal 24. The flywheel 72 is also supported on a set of shock absorbers 84. The shaft 86 which drives a pinion 88 may if desired be provided with a rotary coupling 82, as shown. The pinion 88 driven by motor 80 in turn engages a pinion gear 90, such that the flywheels 72 provide rotary motion in either direction as indicated by movement arrows. Thus, in order to drive the vehicle in one direction, the air bag 74 associated with the desired drive rail 70 is inflated, and to drive the vehicle in the opposite direction, the air bag 74 of the other drive rail 70 is inflated, thereby engaging the opposite spinning flywheel 72.

For high-speed systems such as those shown, power demands are greater as the vehicle 12 accelerates. Once a desired speed for the vehicle 12 is achieved, power consumption stabilizes as a function of speed (maintaining desired speed plus overcoming aerodynamic drag and rolling friction). In order to minimize the size and cost of the motors for high-speed versions of the present invention, the energy-storing flywheel 72 is incorporated into the rings 16. This allows a smaller motor (separate from the rollers motor) to use the time between the passage of the vehicle 12 to bring the flywheel 72 up to a desired speed prior to the arrival of the next vehicle 12. This is a cost saving design feature as it allows sufficient power to be brought to bear and avoids the high costs of high-speed locomotives.

However it should be understood that alternative drive mechanisms for the vehicles 12 might be used. They include, for example, magnetic propulsion, or onboard power generation for developing thrust, such as jet-propelled, or propeller driven motive force generators.

Figure 2A:
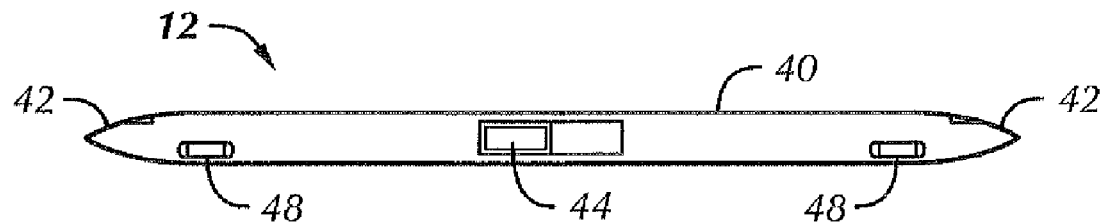
FIG. 2a is a side elevation view of the vehicle of this invention.
Figure 2B:
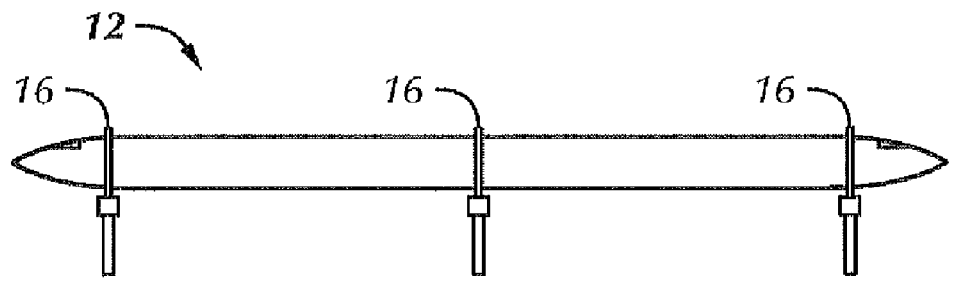
FIG. 2b is a side elevation view of the vehicle deployed in a set of rings.

FIGS. 2a and 2b depict additional features and details of the vehicle 12. The vehicle includes a central, cylindrical fuselage or body 40, the length of which must be at least the distance between three sequentially located or disposed rings 16. The vehicle 12 also includes a tapered cabin 42 on each end, which may serve as a cockpit, if desired. Mounted within the vehicle is a diesel or other power driven generator 44 to supply electrical power to the vehicle's service, hotel and passenger convenience loads, such as lights, heating and air conditioning, galley services, ventilation, and the like. The diesel generator 44 is supplied with energy from a suitable source, such as fuel from an on-board fuel tank 46 in the conventional manner. For greater strength and structural integrity, the body 40 of vehicle 12 may be designed to be in a state of compression, such as through the use of tensioning cables.

Figure 5A:
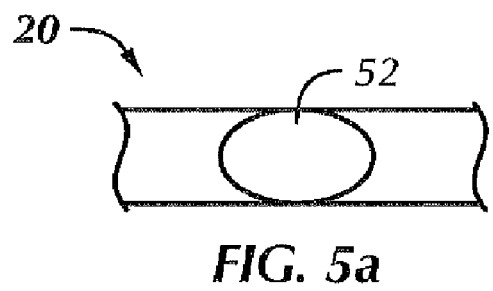
FIGS. 5a and 5b are top and side view of a side rail joint respectively.
Figure 5B:
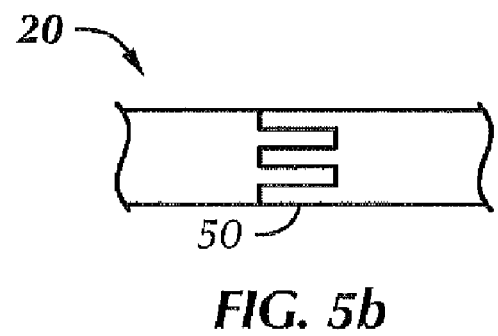

The vehicle 12 also houses one or more nitrogen tanks 48. The tanks 48 provide nitrogen to the inside of the rails 20 to develop a thin ice layer on the rails to reduce drag and rolling friction, as herein described. This feature of the invention is shown in more detail in FIGS. 5a, 5b 6a, and 6b. FIG. 5a shows a top view and FIG. 5b shows a side view, and together these figures depict details of a rail 20. Each rail 20 includes at least one joint 50 which provides for flexing of the rail and the vehicle 12, and accounts for thermal expansion and retraction. The joint 50 includes an overlap area 52 having curved ends to accommodate back and forth flexing of the joint.

Figure 6A:
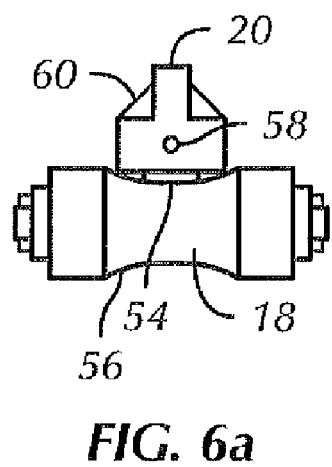
FIGS. 6a and 6b are side and end views of a vehicle guide roller, respectively.
Figure 6B:
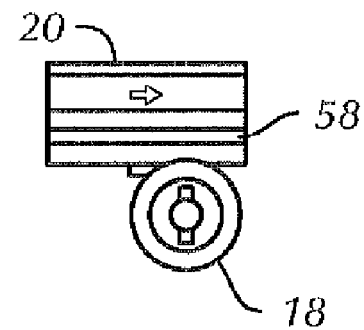

The rail 20 preferably defines a curved contact surface 54 which provides stable retention of the vehicle 12 within the five rails 20, as shown in FIG. 4. The surface 54 contacts a complementary curved surface 56 of the roller 18, and a surface layer of cold condensation or ice is formed between them by the nitrogen system, provided by a nitrogen tube 58. An insulation sleeve 60 along each rail 20 conserves thermal energy. As shown in FIG. 6b, as the vehicle travels in the direction shown by a directional arrow, a suitably thin layer of condensate is produced as the leading contact point between the rail 20 and the roller 18, creating a low friction lift between them and reducing drag. This feature substantially reduces the energy required for operation of the system 10.

FIGS. 7, 8a, and 8b show further details of the undercarriage of the system 10. The storage tank 48 supplies chilled or liquid nitrogen or some other suitably cold fluid through a delivery line 62 into the tube 58, which is deployed within and along the length of the rail 20. The nitrogen in delivery line 62 may be recycled through a continuous loop, or delivery line 62 may be configured so that the cold fluid vents out through an outlet vent valve or outlet 64. The linear clutch plate 21 is flexibly mounted to the vehicle 40 with a set of air bags or other shock absorbers 66, which absorb shock and provide a smooth ride of the vehicle. For more extreme motions of the clutch plates 21 against the flywheel 72, a set of rubber stoppers or bodies 68 act as bumpers to absorb the impact.

Figure 10:
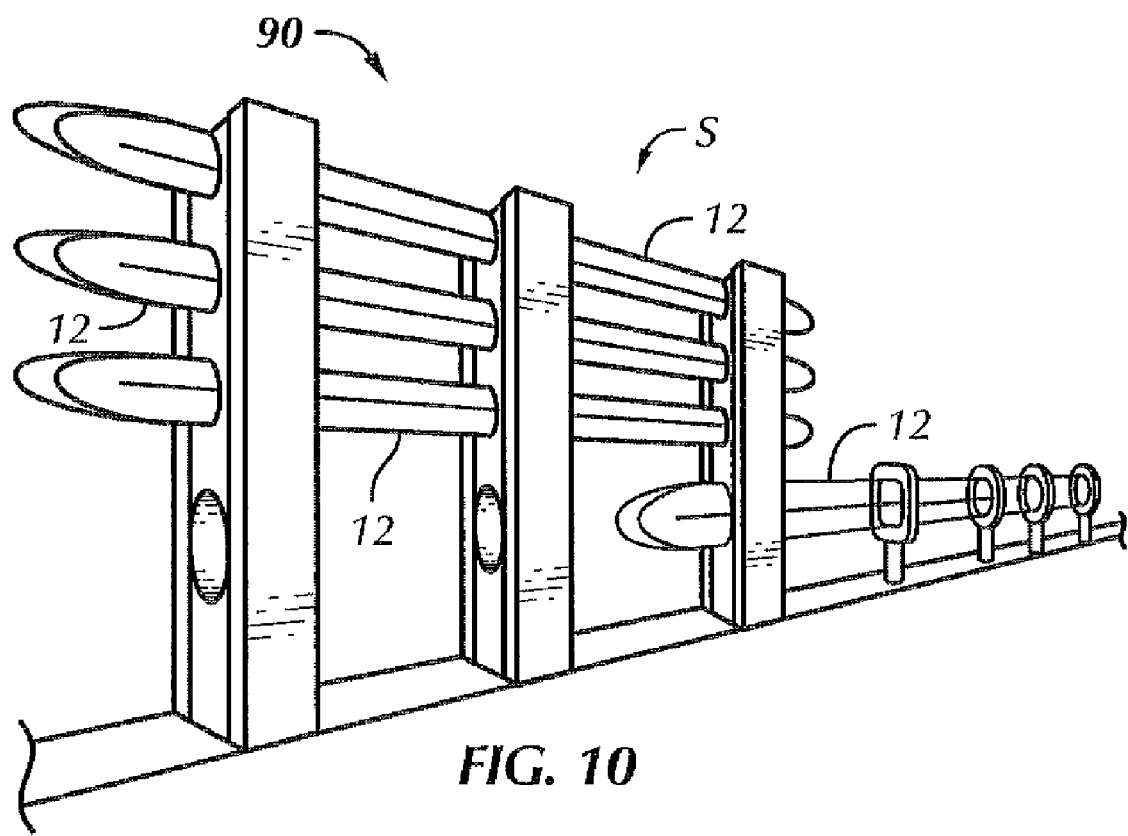
FIG. 10 is an isometric view of rings arranged in vertical multiples according to the present invention.
Figure 11:
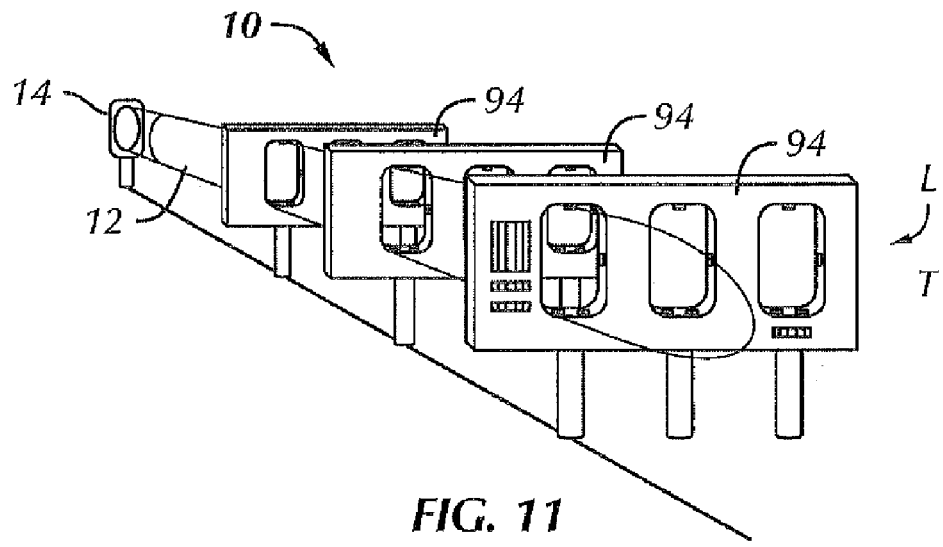
FIG. 11 is an isometric view of rings arranged in horizontal tandem according to the present invention.

The system 10 according to the present invention may be provided at suitable locations along its route with a vertical lift system S as shown in FIG. 10. The vertical lift system S would operate in similar engineering principles to lift bridges or floodgates, and allows passage of another vehicle through the lift systems while others have been moved out of the path of travel into a vertically disposed rack 90 to an out of service position. The vehicles 12 in the rack 90 are retained there for a variety of reasons, such as: allowing passage of another vehicle; storage of vehicles for later use of at times of higher traffic volume; repair; cleaning; maintenance; service and the like. The vertical lift system S could also function as a boarding/loading station on point of departure. Passengers could enter a vehicle 12 on the rack which would then be moved into the travel path at time of departure.

The system 10 according to the present invention may also be provided with a lateral or horizontal transfer/storage system L (FIG. 11) at suitable locations along its route. The lateral system L has a suitable number of rings 16 which are laterally movable in a direction perpendicular to the path of travel within a pedestal supported larger ring housing 94. As with the vertical system S, the lateral system L permits vehicles to be moved away from the main path of travel for storage, retention and other reasons mentioned above in connection with the vertical system S. It should be understood that a system combining both vertical and horizontal transfer might also be used.

Figure 12:
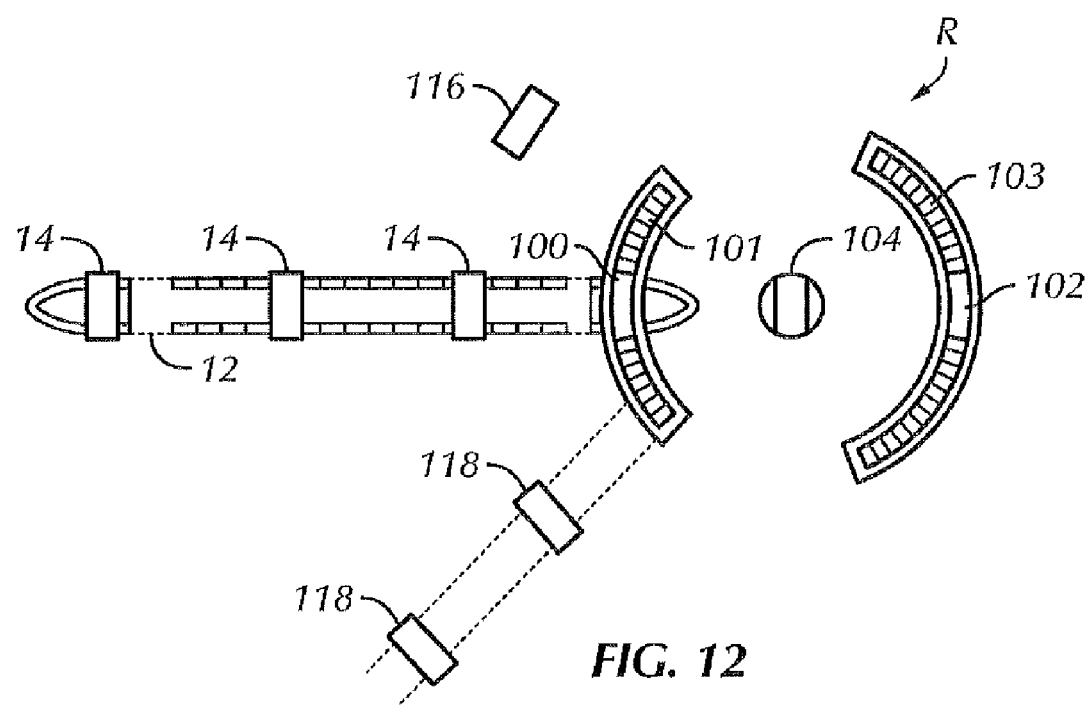
FIG. 12 is a plan view of an arrangement for moving a vehicle according to the present invention to a different path of travel.

Further, the system 10 of the present invention is provided with a rotary station or table R (FIG. 12), operating on principles like those of a railroad round house. Pedestal mounted supports 100 and 102 are movable in circular, arcuate paths 101 and 103 respectively about a centrally located, rotatable support 104. The supports 100, 102 and 104 are otherwise of like structure and operation to the supports 14 with rings 16 of the types shown in FIGS. 4, 4a or 4b. The supports 100, 102 and 104 are moved into an aligned position to receive a vehicle 12 entering the table R in a first direction, as shown in FIG. 12. After the vehicle 12 moves to a position supported by the supports 100, 102 and 104, the supports 100 and 102 are moved along their arcuate paths about the rotatable support 104 until the vehicle 12 is aligned with a different set of rings as shown at 116 or 118 along a new direction of travel.

Energy is lost to two main factors in any rail system. The first is rolling friction caused by interactions between the rail and the wheel, while the other is aerodynamic drag. Rolling function is virtually constant and varies little with changes in speed or weight of the train. Unlike rolling friction, aerodynamic drag varies greatly with speed and increases as the square of speed. Thus, a doubling of speed leads to a quadrupling of aerodynamic drag. In general, aerodynamic drag energy losses begin to exceed that of rolling friction in the speed range of 55 mph to 70 mph. As has been noted, to the shape of the car 12 may be varied based on the intended design speed.

Figure 14:
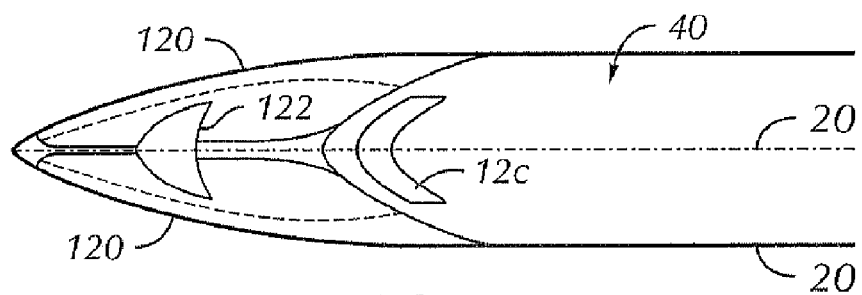
FIG. 14 is a side elevation view of the modified vehicle of FIG. 13.
Figure 15:
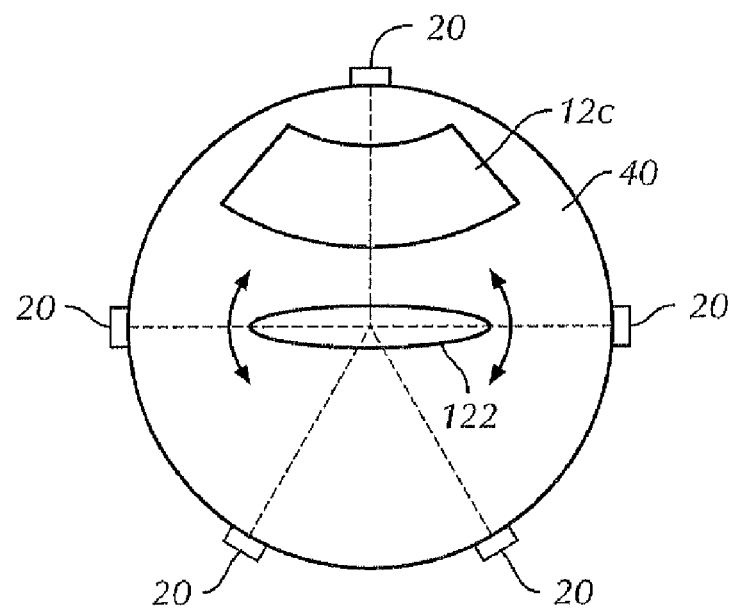
FIG. 15 is a front view of a portion of the vehicle of FIGS. 13 and 14.

For trains, energy consumed in overcoming rolling friction shows little increase as speed increases. For high-speed, such as greater than 150 mph, aerodynamic related issues are a far greater concern in terms of energy losses. For this reason, as shown in FIGS. 13, 14 and 15, rails 20 may be configured to extend forward past the ends of the vehicle body 40 to form a rearwardly tapering lead surface in an air drag reducing configuration 121 and airfoil members 122 attached to the vehicle 40 for air drag reduction and steering purposes, and countering gravity deflection.

Figure 13:
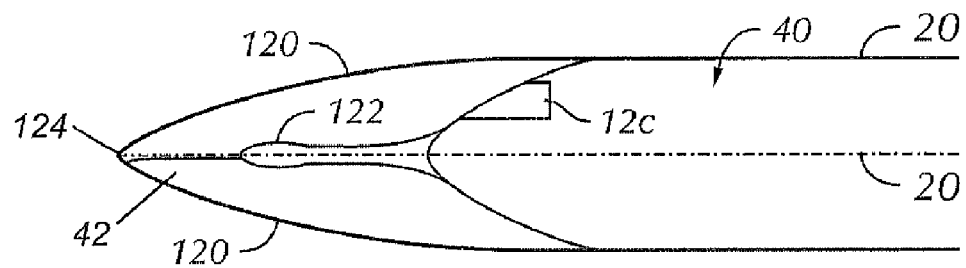
FIG. 13 is a top view of a modification of a vehicle according to the present invention.

The reason the rails 120 in FIG. 13 extend fore and aft of the body 12 is to lower the weight that becomes cantilevered thus decreasing the amount of deflection. The extended rails 120 come in contact with the next set of rollers 18 and the weight of the body 12 begins to transfer to the next set of rollers 18. The opposite occurs at the rear of the car body 12 as it leaves the rollers 18. The instantaneous weight on the rollers 18 decreases gradually as the car leaves the rollers 18 thus preventing a snapping action. The rails 120 are also tapered to counteract what remains of the deflection effect thus providing a smooth transition. The airfoil 122 is movable and may be pivoted as indicated in FIG. 15 about an axis corresponding to the longitudinal axis of the vehicle 12. The airfoil 122 is thus rotatably mounted on a structure that extends from the nose of the taped cabin 42 of vehicle 12 to a point 124 where the rails 120 come together. The airfoil 122 is capable of some rotational movement that, at speed will produce lift perpendicular to the airfoil surface. This small amount of lift, at higher speeds, will tend to move the rails 120 in the direction of the induced lift. This also counteracts the deflection effect and can be used to assist in a turn to provide gradual turning to the vehicle 12.

Also, the cooling of the rails below the local dew point and then below the freezing point of water will induce atmospheric moisture to condense on the rails and form a barrier to the formation of molecular bonding between the steel of the wheels and the steel rail. Since the cost of cooling is relatively inexpensive to do with liquid nitrogen (although other methods could be used) this method is proposed.

For higher speed operation when the motive force is supplied by the frictional transference of energy from the flywheel assembly 30 reduction of energy lost to rolling friction can greatly lower energy consumed. As the moisture condenses on the rails it typically freezes, then turns to liquid as the rail nears the roller and pressure rises. This should produce a boundary layer of water under higher pressure between two surfaces, thus the hydroplaning effect. This can also be thought of as a form of viscous hydroplaning. This can be enhanced by the addition of a fine mist of water vapor moving with the rails and containing surface tension increasing chemical additives in the vapor. The overall purpose is to reduce the ability of the rail and roller to form molecular and/or metallic bonds thus reducing the energy needed to then break these bonds.

Rail cooling techniques, if used at all, will find their best applications for operations at higher speed. In addition to energy savings the effect should also produce lower noise levels emanating from the rail/roller interface. Also it will have a lubricating effect when it is necessary to force the car into a turn.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the at without departing from the spirit of the invention.

The invention claimed is:

1. An apparatus for reducing friction comprising:
   a vehicle having at least one passive rail, at least one motive rail, and a cold fluid supply;
   a support having at least one passive roller and at least one powered roller;
   the at least one powered roller rollingly engaging the at least one motive rail and the at least one passive roller rollingly engaging the at least one passive rail;
   a drive causing the at least one powered roller to engage the at least one motive rail;
   a cold fluid flowing from the cold fluid supply to adjacent one or more of the at least one passive rail and/or the at least one motive rail; and
   a cold condensate being formed between the one or more of the at least one passive rail and/or the at least one motive rail and one or more of the at least one passive roller and/or the at least one powered roller reducing frictional between the one or more of the at least one passive roller and/or the at least one powered roller and the one or more of the at least one passive rail and/or the at least one motive rail.

2. The apparatus of claim 1 wherein the one or more of the at least one passive rail and/or the at least one motive rail is hollow to flow a cold fluid therethrough.

3. The apparatus of claim 1 wherein the cold fluid is liquid nitrogen.

4. The apparatus of claim 1 wherein the cold condensate is a layer of ice.

5. The apparatus of claim 4 wherein the cold fluid rapidly cools the one or more of the at least one passive rail and/or the at least one motive rail causing the ice layer to form on the one or more of the at least one passive rail and/or the at least one motive rail.

6. The apparatus of claim 4 wherein the ice layer is formed on the one or more of the at least one passive rail and/or the at least one motive rail by condensing atmospheric moisture on the one or more of the at least one passive rail and/or the at least one motive rail.

7. The apparatus of claim 1 wherein the cold condensate reduces drag between the one or more of the at least one passive roller and/or the at least one powered roller and one or more of the at least one passive rail and/or the at least one motive rail.

8. The apparatus of claim 1 wherein the cold condensate limits the bonding between one or more of the at least one passive roller and/or the at least one powered roller and the one or more of the at least one passive rail and/or the at least one motive rail.

9. The apparatus of claim 1 wherein the one or more of the at least one passive rail and/or the at least one motive rail is mounted on the vehicle and the cold fluid is circulated from the vehicle to adjacent the one or more of the at least one passive rail and/or the at least one motive rail.

10. The apparatus of claim 1 wherein the one or more of the at least one passive rail and/or the at least one motive rail includes a tube for the cold fluid.

11. The apparatus of claim 1 further including an insulation sleeve on the one or more of the at least one passive rail and/or the at least one motive rail to conserve thermal energy.

12. The apparatus of claim 1 further including a recirculation loop for the cold fluid.

13. The apparatus of claim 1 further including a vent in a delivery line for the cold fluid.

14. The apparatus of claim 13 wherein the vent includes a valve.

15. An apparatus comprising:
an elongate vehicle having a body;
at least one rail and at least one friction plate mounted longitudinally along the vehicle body;
a plurality of supports each forming an elevated portal through which the vehicle travels;
first and second drives on each of the supports to selectively engage the vehicle;
the at least one rail being engageable by the first drive to receive motive power for the vehicle;
the second drive engaging the at least one friction plate at an elevated speed to provide motive power to the vehicle;
a cold fluid flowing adjacent the at least one rail while at the elevated speed; and
a cold condensate being formed between the at least one rail and the first drive to reduce the engagement between the first drive and the at least one rail while at the elevated speed.

16. An apparatus comprising:
an elongate vehicle having a body with aft and fore ends;
at least one metal rail mounted longitudinally along the vehicle body, the at least one metal rail having a side portion extending along the body and at least a fore portion;
at least one linear plate mounted longitudinally along the vehicle body;
a plurality of supports each forming an elevated portal;
metal drive rollers and drive flywheels on the supports to selectively engage the vehicle;
the at least one metal rail being engageable by the metal drive rollers and the at least one linear plate being selectively engageable by the drive flywheels;
the weight of the vehicle body causing the at least one metal rail to frictionally engage the metal drive rollers to transfer motive power to the vehicle;
a reciprocating movement mechanism to move the at least one linear plate into engagement with the drive flywheels upon the vehicle reaching an elevated speed;
a cold fluid flowing adjacent the at least one metal rail while at the elevated speed; and
a cold condensate being formed between the at least one metal rail and the metal drive rollers to reduce the engagement between the metal drive rollers and the at least one metal rail while at the elevated speed.

17. The apparatus of claim 16 wherein the fore portion contacts metal drive rollers prior to the side portion contacting metal rollers.

* * * * *